United States Patent
Kruck

(10) Patent No.: US 9,800,647 B1
(45) Date of Patent: Oct. 24, 2017

(54) SYSTEMS AND METHODS FOR PROVISIONING COMPUTING SYSTEMS WITH APPLICATIONS

(71) Applicant: Symantec Corporation, Mountain View, CA (US)

(72) Inventor: Joshua D. Kruck, St. Paul, MN (US)

(73) Assignee: Veritas Technologies LLC, Mountain View, CA (US)

(*) Notice: Subject to any disclaimer, the term of this patent is extended or adjusted under 35 U.S.C. 154(b) by 645 days.

(21) Appl. No.: 14/073,158

(22) Filed: Nov. 6, 2013

(51) Int. Cl.
*H04L 29/08* (2006.01)
*H04L 12/24* (2006.01)

(52) U.S. Cl.
CPC ............ *H04L 67/06* (2013.01); *H04L 41/08* (2013.01)

(58) Field of Classification Search
CPC ............ H04L 63/102; H04L 63/0428; H04L 63/0897; H04L 67/06; G06F 11/1448; G06F 21/6218
USPC .......... 709/204; 719/310; 701/468; 713/165, 713/189
See application file for complete search history.

(56) References Cited

U.S. PATENT DOCUMENTS

| | | | | |
|---|---|---|---|---|
| 8,666,938 | B1* | 3/2014 | Pancholy | G06F 9/455 707/610 |
| 8,954,987 | B1* | 2/2015 | Reeves et al. | 719/310 |
| 2002/0012424 | A1* | 1/2002 | Nishio et al. | 379/100.06 |
| 2002/0052941 | A1* | 5/2002 | Patterson | 709/223 |
| 2002/0091918 | A1* | 7/2002 | Lakshman | 713/1 |
| 2002/0100036 | A1* | 7/2002 | Moshir et al. | 717/173 |
| 2003/0126202 | A1* | 7/2003 | Watt | G06F 9/4401 709/203 |
| 2003/0218631 | A1* | 11/2003 | Malik | 345/739 |
| 2005/0057560 | A1* | 3/2005 | Bibr et al. | 345/418 |
| 2005/0229030 | A1* | 10/2005 | Nagashima | H04L 67/1097 714/5.11 |
| 2007/0043715 | A1* | 2/2007 | Kaushik et al. | 707/4 |
| 2008/0005560 | A1* | 1/2008 | Duffus et al. | 713/164 |
| 2008/0115071 | A1* | 5/2008 | Fair | G06F 11/1451 715/764 |
| 2008/0205610 | A1* | 8/2008 | Bishop | 379/93.24 |
| 2012/0246472 | A1* | 9/2012 | Berengoltz et al. | 713/165 |

(Continued)

*Primary Examiner* — David Lazaro
*Assistant Examiner* — Berhanu Shitayewoldetsad
(74) *Attorney, Agent, or Firm* — FisherBroyles LLP

(57) ABSTRACT

A computer-implemented method for provisioning computing systems with applications may include (1) identifying a request to provision a computing system with an application in a pre-determined configuration state, where the pre-determined configuration state of the application is separated from a prior configuration state of the application by at least one configuration step, (2) locating a backup system that stores a pre-configured instance of the application that has been configured to the pre-determined configuration state at least in part by the configuration step, (3) retrieving the pre-configured instance of the application from the backup system, and (4) provisioning the computing system with the application in the pre-determined configuration state without performing the configuration step by copying the pre-configured instance of application that was retrieved from the backup system to the computing system. Various other methods, systems, and computer-readable media are also disclosed.

19 Claims, 7 Drawing Sheets

(56) References Cited

U.S. PATENT DOCUMENTS

2012/0254030 A1* 10/2012 Khan .................. H04L 63/0853
  705/41
2013/0060919 A1* 3/2013 Khandekar et al. .......... 709/220

* cited by examiner ural computing device was purchased, or when an operating system was upgraded on a computing device. But remote data centers, the cloud, and virtual machines have given rise to an era where dozens or hundreds of new computing systems can require provisioning on a daily basis. Unfortunately, allowing users to configure their own computing systems may violate enterprise security policies that require certain security settings on enterprise computing systems, meaning that a select number of employees may be responsible for provisioning a great number of computing systems. In addition, some traditional systems may require these employees to individually configure applications on every computing system being provisioned, leading to decreased productivity and increased chance for error. Other traditional systems may automatically configure applications by running set-up scripts, locating dependencies, and/or seeding databases, a process which may be both slow and prone to error.

SYSTEMS AND METHODS FOR PROVISIONING COMPUTING SYSTEMS WITH APPLICATIONS

BACKGROUND

Provisioning a computing system can be a complicated and error-prone task. The computing system may need to be provisioned with many applications, each of which may need to have settings configured, data entered, and/or files altered. Provisioning multiple computing systems across an entire data center or even several data centers is significantly more complicated, and may involve the tedious and repetitive task of configuring the same enterprise-wide settings again and again.

In the past, provisioning computing systems took place mainly when a new physical computing device was purchased, or when an operating system was upgraded on a computing device. But remote data centers, the cloud, and virtual machines have given rise to an era where dozens or hundreds of new computing systems can require provisioning on a daily basis. Unfortunately, allowing users to configure their own computing systems may violate enterprise security policies that require certain security settings on enterprise computing systems, meaning that a select number of employees may be responsible for provisioning a great number of computing systems. In addition, some traditional systems may require these employees to individually configure applications on every computing system being provisioned, leading to decreased productivity and increased chance for error. Other traditional systems may automatically configure applications by running set-up scripts, locating dependencies, and/or seeding databases, a process which may be both slow and prone to error.

Accordingly, the instant disclosure identifies and addresses a need for additional and improved systems and methods for provisioning computing systems with applications.

SUMMARY

As will be described in greater detail below, the instant disclosure generally relates to systems and methods for provisioning computing systems with applications by locating a backup system with a pre-configured image of an application and installing the application from the image on the backup system. In one embodiment, a computer-implemented method for provisioning computing systems with applications may include (1) identifying a request to provision a computing system with an application in a pre-determined configuration state, where the pre-determined configuration state of the application is separated from a prior configuration state of the application by at least one configuration step, (2) locating a backup system that stores a pre-configured instance of the application that has been configured to the pre-determined configuration state at least in part by the configuration step, (3) retrieving the pre-configured instance of the application from the backup system, and (4) provisioning the computing system with the application in the pre-determined configuration state without performing the configuration step by copying the pre-configured instance of application that was retrieved from the backup system to the computing system.

In some examples, the computer-implemented method may further include performing an additional configuration step on the application that is specific to an environment of the computing system being provisioned. In one embodiment, the additional configuration step may include at least one of: (1) creating a registry entry for the application on the computing system, (2) altering a registry entry for the application on the computing system, (3) editing a hostname file for the application on the computing system, (4) editing a configuration file for the application on the computing system, and/or (5) setting a preferred network for the application on the computing system.

In one embodiment, the configuration step may include at least one of configuring a setting of the application, and/or populating the application with data. In some examples, the setting may include a pre-determined setting within the application that is designed to be configured identically across a plurality of computing systems within an enterprise.

In one embodiment, the application may include a virtual machine. In this embodiment, the computer-implemented method may include (1) identifying the request to provision the computing system with the application by identifying the request to provision the computing system with a virtual machine that may include at least one additional application, (2) locating the backup system that stores the pre-configured instance of the application by locating the backup system that stores a pre-configured image of the virtual machine that may include the additional application, (3) retrieving the pre-configured instance of the application by retrieving the pre-configured image of the virtual machine, and (4) provisioning the computing system with the application by provisioning the computing system with the virtual machine.

In one embodiment, the application may include an operating system. In this embodiment, the computer-implemented method may include (1) identifying the request to provision the computing system with the application by identifying the request to provision the computing system with a pre-configured operating system, (2) locating the backup system that stores the pre-configured instance of the application by locating the backup system that stores an image of the pre-configured operating system, (3) retrieving the pre-configured instance of the application by retrieving the image of the pre-configured operating system, and (4) provisioning the computing system with the application by provisioning the computing system with the pre-configured operating system.

In some examples, locating the backup system that stores the pre-configured instance of the application may include determining that the pre-configured instance of the application has been subject to the configuration step. Additionally or alternatively, locating the backup system that stores the pre-configured instance of the application may include determining that the pre-configured instance of the application is in a pre-determined provisioning state.

In one embodiment, a system for implementing the above-described method may include (1) an identification module that identifies a request to provision a computing system with an application in a pre-determined configuration state, where the pre-determined configuration state of the application is separated from a prior configuration state of the application by at least one configuration step, (2) a location module that locates a backup system that stores a pre-configured instance of the application that has been configured to the pre-determined configuration state at least in part by the configuration step, (3) a retrieving module that retrieves the pre-configured instance of the application from the backup system, (4) a provisioning module that provisions the computing system with the application in the pre-determined configuration state without performing the configuration step by copying the pre-configured instance of application that was retrieved from the backup system to the computing system, and (5) at least one processor configured to execute the identification module, the location module, the retrieving module, and the provisioning module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a request to provision a computing system with an application in a pre-determined configuration state, where the pre-determined configuration state of the application is separated from a prior configuration state of the application by at least one configuration step, (2) locate a backup system that stores a pre-configured instance of the application that has been configured to the pre-determined configuration state at least in part by the configuration step, (3) retrieve the pre-configured instance of the application from the backup system, and (4) provision the computing system with the application in the pre-determined configuration state without performing the configuration step by copying the pre-configured instance of application that was retrieved from the backup system to the computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
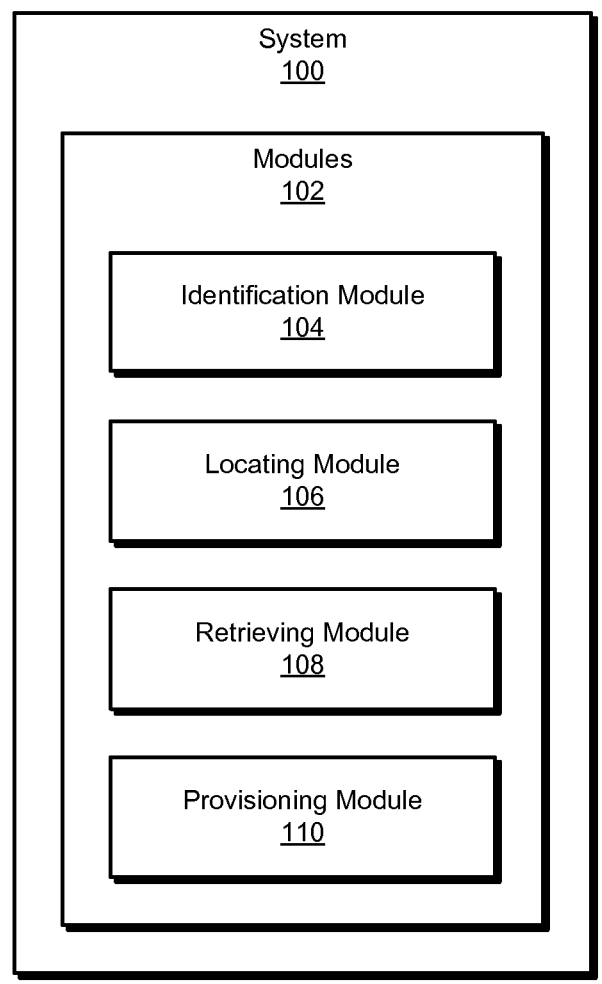
FIG. 1 is a block diagram of an exemplary system for provisioning computing systems with applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for provisioning computing systems with applications. As will be explained in greater detail below, provisioning computing systems from a pre-configured backup image rather than a traditional installation may allow computing systems to be provisioned more quickly and efficiently while keeping uniform settings and data and reducing configuration errors.

Figure 2:
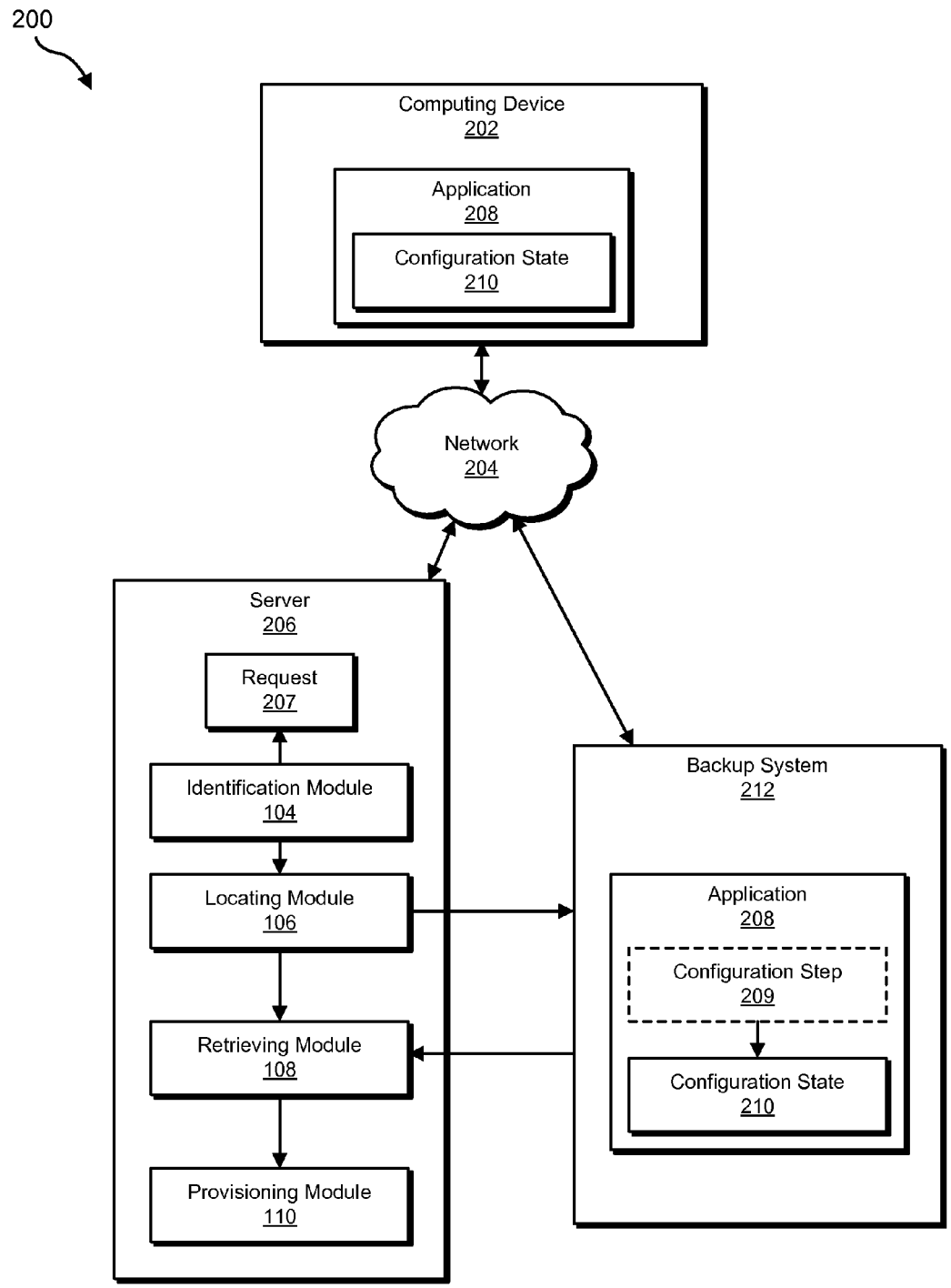
FIG. 2 is a block diagram of an additional exemplary system for provisioning computing systems with applications.
Figure 3:
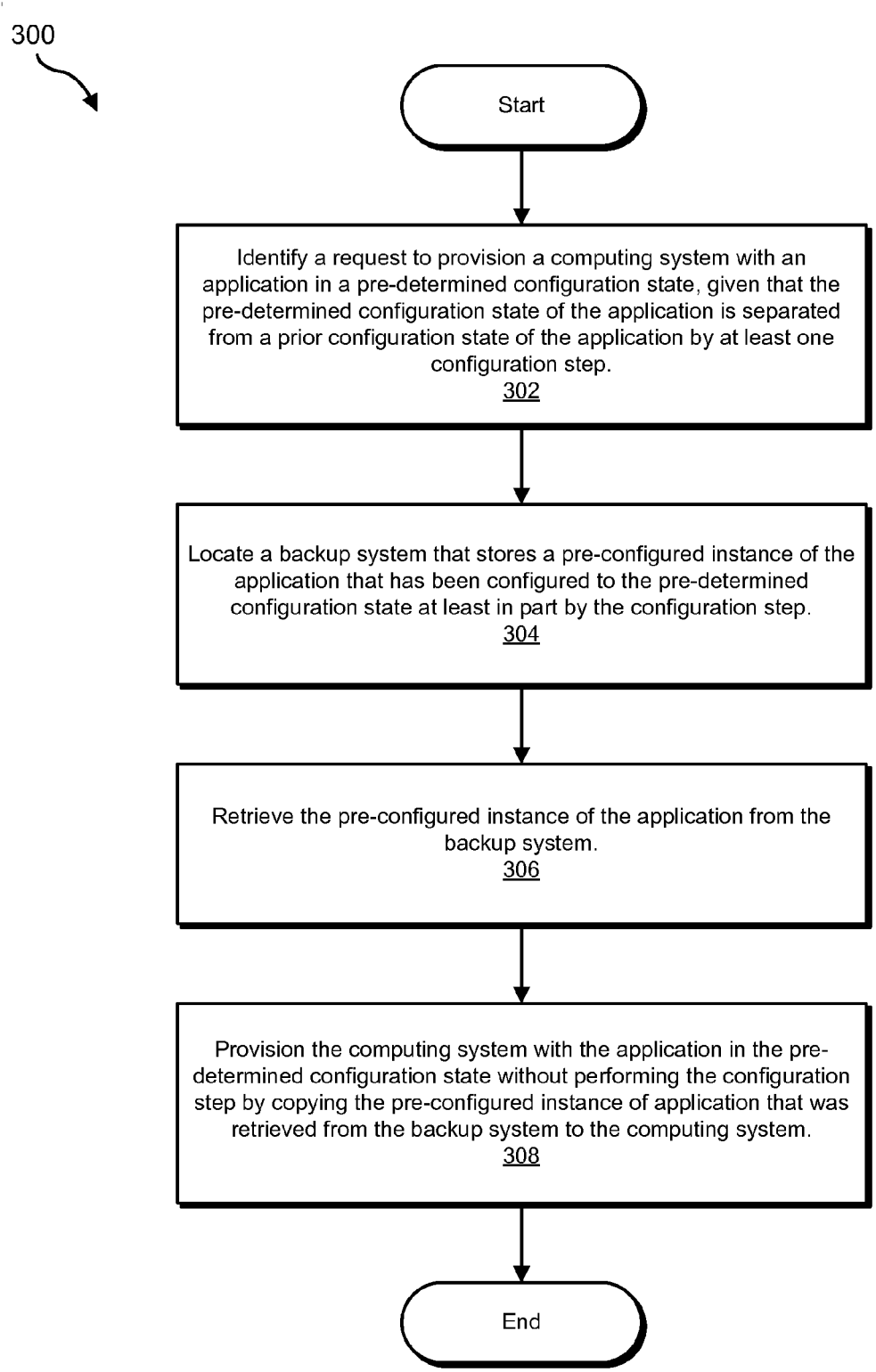
FIG. 3 is a flow diagram of an exemplary method for provisioning computing systems with applications.
Figure 4:
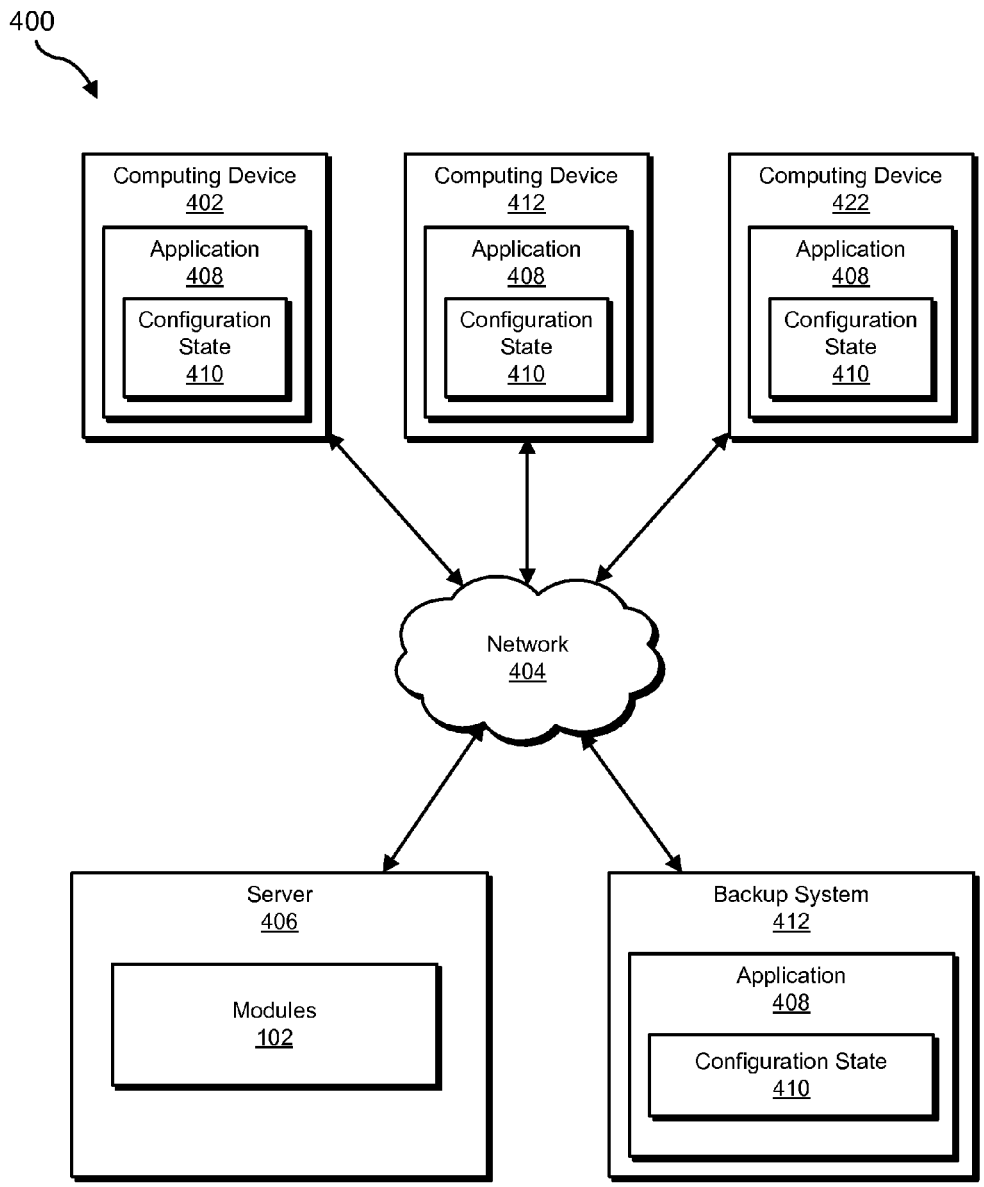
FIG. 4 is a block diagram of an exemplary system for provisioning computing systems with applications.

The following will provide, with reference to FIGS. 1, 2, and 4, detailed descriptions of exemplary systems for provisioning computing systems with applications. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for provisioning computing systems with applications. As illustrated in this figure, exemplary system 100 may include one or more modules 102 for performing one or more tasks. For example, and as will be explained in greater detail below, exemplary system 100 may include an identification module 104 that may identify a request to provision a computing system with an application in a pre-determined configuration state, where the pre-determined configuration state of the application may be separated from a prior configuration state of the application by at least one configuration step.

Exemplary system 100 may additionally include a location module 106 that may locate a backup system that stores a pre-configured instance of the application that has been configured to the pre-determined configuration state at least in part by the configuration step. Exemplary system 100 may also include a retrieving module 108 that may retrieve the pre-configured instance of the application from the backup system.

Exemplary system 100 may additionally include a provisioning module 110 that may provision the computing system with the application in the pre-determined configuration state without performing the configuration step by copying the pre-configured instance of application that was retrieved from the backup system to the computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules.

In one embodiment, one or more of modules 102 from FIG. 1 may, when executed by at least one processor of computing device 202 and/or server 206, enable computing device 202 and/or server 206 to provision computing systems with applications. For example, and as will be described in greater detail below, one or more of modules 102 may cause computing device 202 and/or server 206 to provision computing device 202 with an application 208 in a configuration state 210, as retrieved from a backup system 212. For example, identification module 104 may identify a request 207 to provision computing device 202 with application 208 in pre-determined configuration state 210, where pre-determined configuration 210 state of application 208 is separated from a prior configuration state of application 208 by at least one configuration step 209. In addition, location module 106 may be programmed to locate backup system 212 that stores a pre-configured instance of application 208 that has been configured to pre-determined configuration state 210 at least in part by configuration step 209. Retrieving module 108 may be programmed to retrieve the pre-configured instance of application 208 from backup system 212. Further, provisioning module 110 may be programmed to provision computing device 202 with application 208 in pre-determined configuration state 210 without performing configuration step 209 by copying the pre-configured instance of application 208 that was retrieved from backup system 212 to computing device 202.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of communicating with and/or hosting a backup system. Examples of server 206 include, without limitation, application servers and database servers configured to provide various database services and/or run certain software applications. In some embodiments, backup system 212 may be hosted by server 206.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for provisioning computing systems with applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a request to provision a computing system with an application in a pre-determined configuration state, where the pre-determined configuration state of the application is separated from a prior configuration state of the application by at least one configuration step. For example, at step 302 identification module 104 may, as part of computing device 202 in FIG. 2, identify request 207 to provision computing device 202 with an application 208 in pre-determined configuration state 210, where pre-determined configuration state 210 of application 208 is separated from a prior configuration state of application 208 by at least one configuration step 209.

The term "application," as used herein, generally refers to any set of computing instructions designed to be run on a computing platform. Examples may include software applications, mobile applications, drivers, scripts, and/or computing programs of any type. Examples of applications may also include virtual machines, virtual machine images, applications installed within virtual machines, and/or operating systems.

Identification module 104 may identify a request in a variety of ways and in a variety contexts. For example, identification module 104 may identify a request to provision a computing system with a software application that has had certain data and/or settings pre-configured. In one example, identification module 104 may identify a request from a provisioning script (e.g., that is configured to provision a computing system with applications) to provision the computing system with an email application that has been populated with a contacts list and pre-set security settings. Additionally or alternatively, identification module 104 may identify the request as part of a provisioning process carried out by a provisioning application such as CHEF or PUPPET. For example, identification module 104 may, as a part of a configuration management and/or provisioning application, identify a request to provision a client with an application.

In some examples, the configuration step may include configuring a setting of the application and/or populating the application with data. In some examples, the setting may include a pre-determined setting within the application that is designed to be configured identically across a plurality of computing systems within an enterprise. For example, the setting may include a data loss prevention setting that must follow the data loss prevention policy for the organization. In some examples, the data may include contact lists, test data, customer data, and/or databases of any type.

At step 304, one or more of the systems described herein may locate a backup system that stores a pre-configured instance of the application that has been configured to the pre-determined configuration state at least in part by the configuration step. For example, at step 304 location module 106 may, as part of computing device 202 in FIG. 2, locate backup system 212 that stores a pre-configured instance of application 208 that has been configured to pre-determined configuration state 210 at least in part by configuration step 209.

The phrase "backup system," as used herein, generally refers to any system capable of storing, managing, and/or retrieving applications and/or images of applications. A backup system may store applications and/or images of applications in any of a variety of formats. Backup systems may store files on a local network and/or remotely over the Internet. Examples of backup systems include SYMANTEC BACKUP EXEC, SYMANTEC NETBACKUP, SYNCBACK, and/or WINDOWS BACKUP AND RESTORE.

Location module 106 may locate the backup system in a variety of ways. For example, location module 106 may locate a backup system that is accessible to the computing device via a network and that stores an image of the software application. The location of the backup system that stores the application image may be specified in the provisioning script, supplied by a user, and/or detected automatically by location module 106. Referring back to the earlier example of the email application, location module 106 may locate a backup system that is specified in the provisioning script and that stores a backup image of the email application that includes the contact list and the pre-set security settings.

In some examples, location module 106 may locate the backup system that stores the pre-configured instance of the application by determining that the pre-configured instance of the application has been subject to the configuration step. In one embodiment, a user may make this determination by providing the provisioning system with the location of the backup system, indicating that the pre-configured instance of the application has been subject to the configuration step. In another embodiment, the location of the backup system and/or the determination that the configuration step has been performed on a specific instance stored within the backup system may be hard-coded into a provisioning script. Additionally or alternatively, location module 106 may analyze the pre-configured instance of the application stored by the backup system to determine that the instance has been subject to the configuration step. For example, the instance may be named and/or tagged in a way that indicates the configuration step has taken place. In another example, location module 106 may check the application image to determine if a setting has been configured and/or a database includes entries. Additionally or alternatively, location module 106 may check a timestamp of a file within the application image to determine that the file was modified (thereby inferring that the configuration step was performed).

In some examples, location module 106 may locate the backup system that stores the pre-configured instance of the application by determining that the pre-configured instance of the application is in a pre-determined provisioning state. In one embodiment, a user may make this determination by providing the provisioning system with the location of the backup system, indicating that the pre-configured instance of the application is in the pre-determined provisioning state. In another embodiment, the location of the backup system and/or the determination that the specific instance stored within the backup system is in the pre-determined provisioning state may be hard-coded into a provisioning script. Additionally or alternatively, location module 106 may analyze the pre-configured instance of the application stored by the backup system to determine that the instance is in the pre-determined configuration state. For example, location module 106 may determine that the instance is named and/or tagged in a way that indicates the instance is in the pre-determined configuration state. In one example, a virtual machine image on a backup system may be named "Dev VM 4/7/13—Safe State," indicating that it is in the pre-determined provisioning state for a clean development environment.

At step 306, one or more of the systems described herein may retrieve the pre-configured instance of the application from the backup system. For example, at step 306 retrieving module 108 may, as part of computing device 202 in FIG. 2, retrieve the pre-configured instance of application 208 from backup system 212.

Retrieving module 108 may retrieve the pre-configured instance of the application in any of a number of ways. For example, retrieving module 108 may request the instance of the software application from the backup system. In one example, retrieving module 108 may use the backup system's API to request the image of the previously mentioned email application. In another example, retrieving module 108 may perform a granular restore by retrieving only the data necessary to install a specific application. Additionally or alternatively, retrieving module 108 may identify the application data within the backup system and copy the data.

At step 308, one or more of the systems described herein may provision the computing system with the application in the pre-determined configuration state without performing the configuration step by copying the pre-configured instance of application that was retrieved from the backup system to the computing system. For example, at step 308 provisioning module 110 may, as part of computing device 202 in FIG. 2, provision computing device 202 with application 208 in pre-determined configuration state 210 without performing configuration step 209 by copying the pre-configured instance of application 208 that was retrieved from backup system 212 to computing device 202.

Provisioning module 110 may provision the computing system with the application in a variety of ways and contexts. For example, provisioning module 110 may provision the computing system with the software application by installing the software application from the image retrieved from the backup system. In one example, provisioning module 110 may provision the computing system with the email application by installing the email application from the backup image with the contact list and pre-set security settings.

In some examples, the systems described herein may perform an additional configuration step on the application that is specific to an environment of the computing system being provisioned. For example, the additional configuration step may include (1) creating a registry entry for the application on the computing system, (2) altering a registry entry for the application on the computing system, (3) editing a hostname file for the application on the computing system, (4) editing a configuration file for the application on the computing system, and/or (5) setting a preferred network for the application on the computing system. In some examples, these systems may determine which configuration steps remain after the application is in the predetermined state and perform the remaining steps. For example, a provisioning application may use a configuration state graph to determine which configuration steps to perform once the application is in the predetermined state. In another example, a provisioning script may install the software application from the backup image, and then create a registry entry for the application on the computing system.

In one embodiment, the application may include a virtual machine. In this embodiment, systems described herein may (1) identify the request to provision the computing system with the application by identifying the request to provision the computing system with a virtual machine that may include at least one additional application, (2) locate the backup system that stores the pre-configured instance of the application by locating the backup system that stores a pre-configured image of the virtual machine that may include the additional application, (3) retrieve the pre-configured instance of the application by retrieving the pre-configured image of the virtual machine, and (4) provision the computing system with the application by provisioning the computing system with the virtual machine. For example, a provisioning script may install a virtual machine from a backup image. The backup image of the virtual machine may include an email application that has been pre-populated with a contact list. The virtual machine installed from the backup image may also be configured with a variety of settings, including but not limited to preferred networks, security settings, and/or display settings.

In one embodiment, the application may include an operating system. In this embodiment, systems described herein may (1) identify the request to provision the computing system with the application by identifying the request to provision the computing system with a pre-configured operating system, (2) locate the backup system that stores the pre-configured instance of the application by locating the backup system that stores an image of the pre-configured operating system, (3) retrieve the pre-configured instance of the application by retrieving the image of the pre-configured operating system, and (4) provision the computing system with the application by provisioning the computing system with the pre-configured operating system. For example, a provisioning script may install an operating system from a backup image. Examples of operating systems may include MICROSOFT WINDOWS, OS/X, and or LINUX.

In some embodiments, the systems described herein may provision multiple computing systems consecutively or concurrently. FIG. 4 is a block diagram of an exemplary computing system 400 for provisioning computing systems with applications. As illustrated in FIG. 4, server 406 may include modules 102 and/or may be connected to network 404. Backup system 412 may include application 408 in configuration state 410 and/or may be connected to network 404. Computing devices 402, 422, and/or 432 may all be connected to network 404 and/or may all need to be provisioned. Modules 102 may provision computing devices 402, 422 and/or 432 with application 408 in configuration state 410 from backup system 412. In some embodiments, modules 102 may provision computing devices 402, 422 and/or 432 consecutively. Additionally or alternatively, modules 102 may provision computing devices 402, 422 and/or 432 concurrently.

Figure 5:
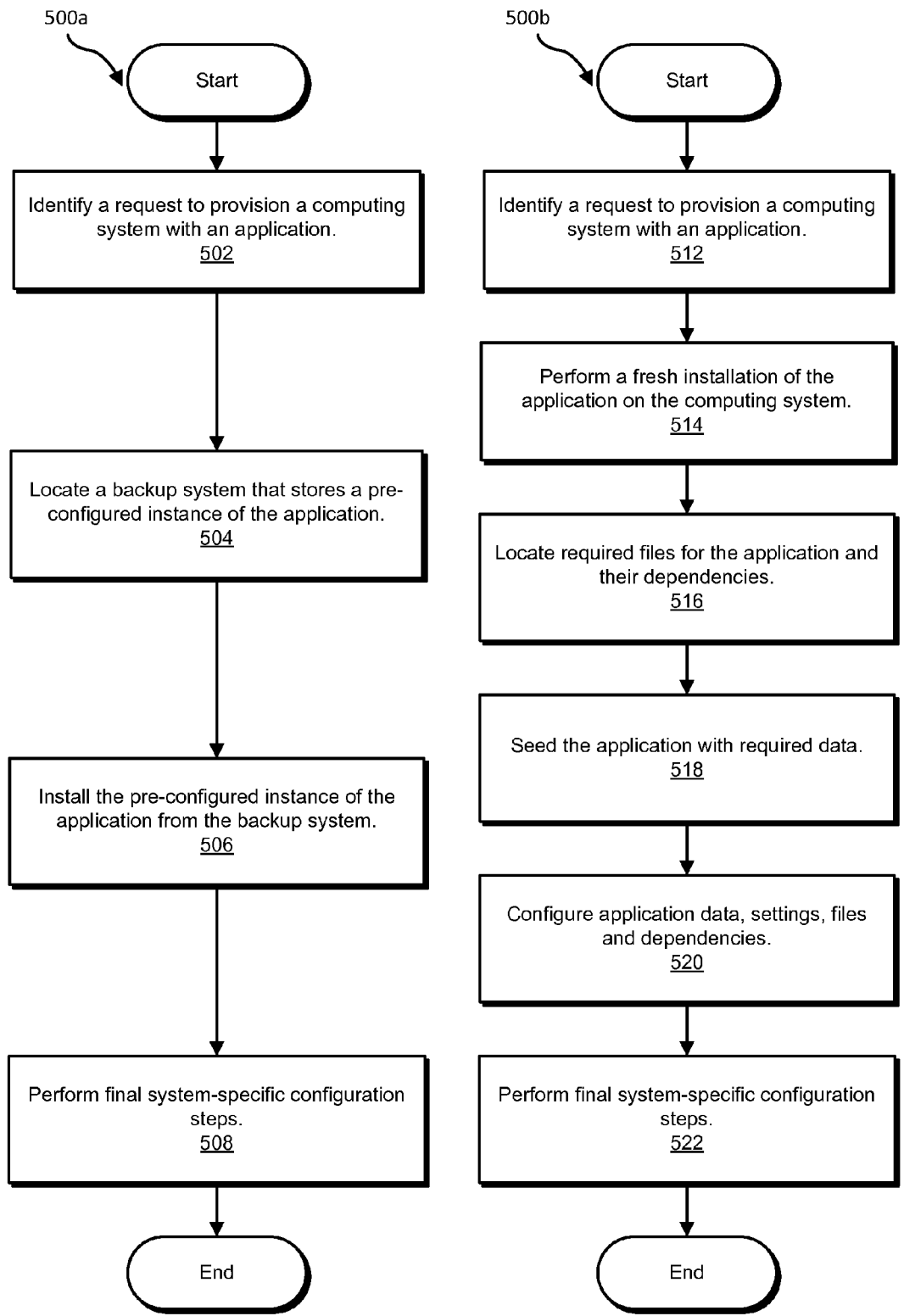
FIG. 5 is a flow diagram of an exemplary method for provisioning computing systems with applications.

By provisioning computing systems with applications from a backup system rather than a fresh installation, the systems described herein may more efficiently provision computing systems. FIG. 5 is a flow diagram of an exemplary computing method 500 for provisioning computing systems with applications as described herein and as done by traditional systems. Method 500a, as described in greater detail above, includes four steps to provision a computing system. At step 502, the systems described herein may identify a request to provision a computing system with an application. In method 500a, this step may be performed by an automated provisioning script. At step 512 in method 500b, a user may manually identify a request to provision a computing system.

At step 504 in method 500a, the systems described herein may locate a backup system that stores a pre-configured instance of the application. At step 506, the systems described herein may install the pre-configured instance of the application from the backup system. This same task may require four steps in traditional systems, as described in method 500b. At step 514 in method 500b, traditional systems may perform a fresh installation of the application on the computing system. At step 516, traditional systems may locate required files for the application and their dependencies. At step 518, traditional systems may seed the application with required data. At step 520, traditional systems may configure application data, settings, files, and/or dependencies. For example, an administrator may manually configure security settings for the application. In both method 500a and 500b, there may be a final optional step of performing final system-specific configuration steps, such as modifying a hosts file or a registry entry.

As explained above in connection with method 300 in FIG. 3, the systems described herein may efficiently provision a computing system with an application by installing the application from a backup system. A provisioning script may be run by a user and/or at a scheduled time and may be requested to provision a computing system with an application that is already configured to a desired state. An image of the application in the desired may be stored in a backup system, the location of which may be hard-coded into the provisioning script, provided by a user, and/or determined by the provisioning script based on analysis.

The provisioning script may retrieve the image from the backup system, for example by calling an API provided by the backup system. The provisioning script may then install the application from the image, thus provisioning the computing system with the application without having to repeat configuration steps already performed on the stored image in the backup system. This may allow the provisioning script to provision computing systems more quickly and efficiently with less opportunity for error.

Figure 6:
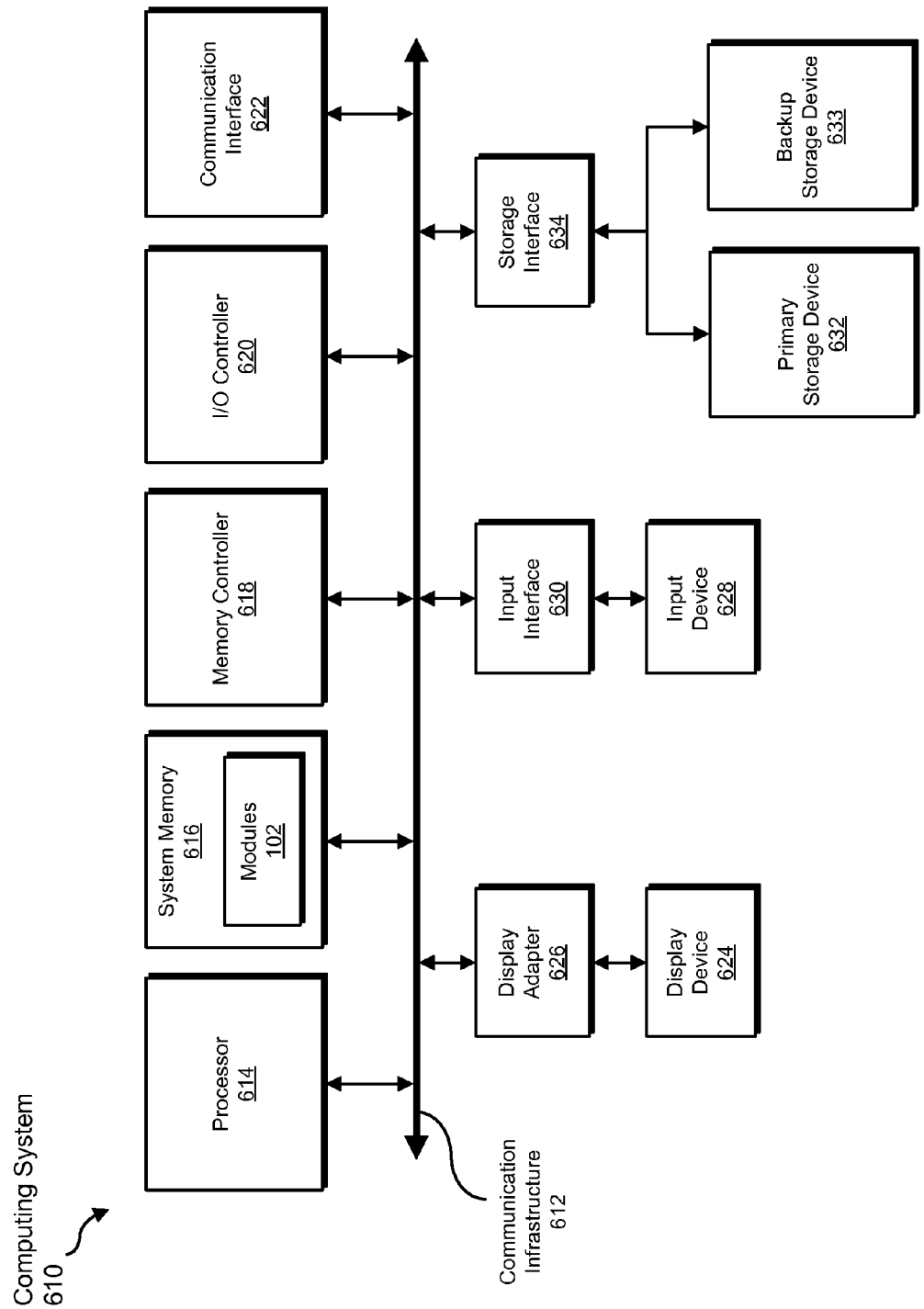
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
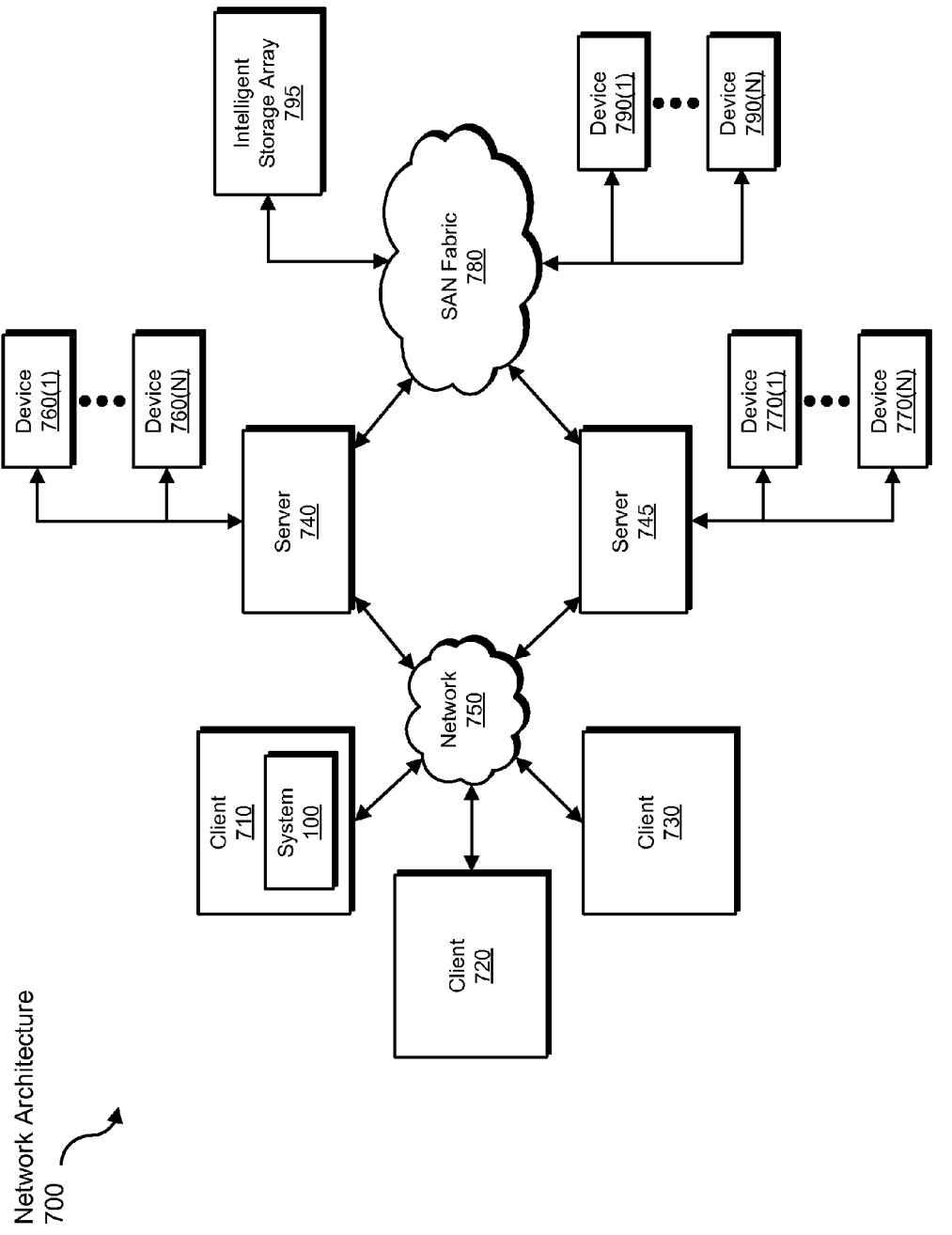
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for provisioning computing systems with applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an application image to be transformed, transform the application image, output a result of the transformation to a computing system, use the result of the transformation to provision the computing system, and store the result of the transformation to the computing system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for provisioning computing systems with applications, at least a portion of the method being performed by a computing device comprising at least one processor, the method comprising:

identifying a request to provision a computing system with an application in a pre-determined configuration state, wherein the pre-determined configuration state of the application is separated from a prior configuration state of the application by at least one configuration step;

locating a backup system that stores a pre-configured instance of the application that has been configured to the pre-determined configuration state at least in part by the configuration step, wherein locating the backup system that stores the pre-configured instance of the application comprises determining that the pre-configured instance of the application is in a pre-determined provisioning state;

retrieving the pre-configured instance of the application from the backup system;

provisioning the computing system with the application in the pre-determined configuration state, without performing the configuration step while provisioning the computing system with the application, by copying the pre-configured instance of the application that was retrieved from the backup system to the computing system.

2. The computer-implemented method of claim 1, further comprising performing an additional configuration step on the application that is specific to an environment of the computing system being provisioned.

3. The computer-implemented method of claim 2, wherein the additional configuration step comprises at least one of:

creating a registry entry for the application on the computing system;

altering a registry entry for the application on the computing system;

editing a hostname file for the application on the computing system;

editing a configuration file for the application on the computing system;

setting a preferred network for the application on the computing system.

4. The computer-implemented method of claim 1, wherein the configuration step comprises at least one of:

configuring a setting of the application;

populating the application with data.

5. The computer-implemented method of claim 4, wherein the setting comprises a pre-determined setting within the application that is designed to be configured identically across a plurality of computing systems within an enterprise.

6. The computer-implemented method of claim 1, wherein:

identifying the request to provision the computing system with the application comprises identifying the request to provision the computing system with a virtual machine that comprises at least one additional application;

locating the backup system that stores the pre-configured instance of the application comprises locating the backup system that stores a pre-configured image of the virtual machine that comprises the additional application;

retrieving the pre-configured instance of the application comprises retrieving the pre-configured image of the virtual machine;

provisioning the computing system with the application comprises provisioning the computing system with the virtual machine.

7. The computer-implemented method of claim 1, wherein:

identifying the request to provision the computing system with the application comprises identifying the request to provision the computing system with a pre-configured operating system;

locating the backup system that stores the pre-configured instance of the application comprises locating the backup system that stores an image of the pre-configured operating system;

retrieving the pre-configured instance of the application comprises retrieving the image of the pre-configured operating system;

provisioning the computing system with the application comprises provisioning the computing system with the pre-configured operating system.

8. The computer-implemented method of claim 1, wherein locating the backup system that stores the pre-configured instance of the application comprises determining that the pre-configured instance of the application has been subject to the configuration step.

9. The computer-implemented method of claim 1, wherein the pre-determined configuration state of the application being separated from the prior configuration state of the application by the configuration step comprises the predetermined configuration state of the application differing from the prior configuration state of the application by the configuration step.

10. The computer-implemented method of claim 1, wherein locating the backup system that stores the pre-configured instance of the application that has been configured to the pre-determined configuration state comprises locating a backup that includes the pre-configured instance of the application and that was not taken from the computing system.

11. The computer-implemented method of claim 1, wherein:

provisioning the computing system with the application in the pre-determined configuration state comprises provisioning a plurality of computing systems with the application in the pre-determined configuration state;

copying the pre-configured instance of the application that was retrieved from the backup system to the computing system comprises copying the pre-configured instance of the application that was retrieved from the backup system to each computing system within the plurality of computing systems.

12. A system for provisioning computing systems with applications, the system comprising:

an identification module that identifies a request to provision a computing system with an application in a pre-determined configuration state, wherein the pre-determined configuration state of the application is separated from a prior configuration state of the application by at least one configuration step;
a location module that locates a backup system that stores a pre-configured instance of the application that has been configured to the pre-determined configuration state at least in part by the configuration step, wherein locating the backup system that stores the pre-configured instance of the application comprises determining that the pre-configured instance of the application is in a pre-determined provisioning state;
a retrieving module that retrieves the pre-configured instance of the application from the backup system;
a provisioning module that provisions the computing system with the application in the pre-determined configuration state, without performing the configuration step while provisioning the computing system with the application, by copying the pre-configured instance of the application that was retrieved from the backup system to the computing system;
at least one memory that stores the identification module, the location module, the retrieving module, and the provisioning module;
at least one processor configured to execute the identification module, the location module, the retrieving module, and the provisioning module.

13. The system of claim 12, further comprising a performing module that performs an additional configuration step on the application that is specific to an environment of the computing system being provisioned.

14. The system of claim 13, wherein the additional configuration step comprises at least one of:
creating a registry entry for the application on the computing system;
altering a registry entry for the application on the computing system;
editing a hostname file for the application on the computing system;
editing a configuration file for the application on the computing system;
setting a preferred network for the application on the computing system.

15. The system of claim 12, wherein the configuration step comprises at least one of:
configuring a setting of the application;
populating the application with data.

16. The system of claim 15, wherein the setting comprises a pre-determined setting within the application that is designed to be configured identically across a plurality of computing systems within an enterprise.

17. The system of claim 12, wherein:
the identification module identifies the request to provision the computing system with the application comprises identifying the request to provision the computing system with a virtual machine that by at least one additional application;
the location module locates the backup system that stores the pre-configured instance of the application comprises locating the backup system that stores a pre-configured image of the virtual machine that by the additional application;
the retrieving module retrieves the pre-configured instance of the application by retrieving the pre-configured image of the virtual machine;
the provisioning module provisions the computing system with the application by provisioning the computing system with the virtual machine.

18. The system of claim 12, wherein:
the identification module identifies the request to provision the computing system with the application by identifying the request to provision the computing system with a pre-configured operating system;
the location module locates the backup system that stores the pre-configured instance of the application by locating the backup system that stores an image of the pre-configured operating system;
the retrieving module retrieves the pre-configured instance of the application by retrieving the image of the pre-configured operating system;
the provisioning module provisions the computing system with the application by provisioning the computing system with the pre-configured operating system.

19. A non-transitory computer-readable-storage medium comprising one or more computer-readable instructions that, when executed by at least one processor of a computing device, cause the computing device to:
identify a request to provision a computing system with an application in a pre-determined configuration state, wherein the pre-determined configuration state of the application is separated from a prior configuration state of the application by at least one configuration step;
locate a backup system that stores a pre-configured instance of the application that has been configured to the pre-determined configuration state at least in part by the configuration step, wherein locating the backup system that stores the pre-configured instance of the application comprises determining that the pre-configured instance of the application is in a pre-determined provisioning state;
retrieve the pre-configured instance of the application from the backup system;
provision the computing system with the application in the pre-determined configuration state, without performing the configuration step while provisioning the computing system with the application, by copying the pre-configured instance of the application that was retrieved from the backup system to the computing system.

* * * * *